United States Patent
Swanson et al.

(10) Patent No.: US 12,319,869 B2
(45) Date of Patent: Jun. 3, 2025

(54) COMPOSITIONS AND METHODS FOR REDUCING INJECTION PRESSURE IN RESOURCE RECOVERY OPERATIONS

(71) Applicant: Solugen, Inc., Houston, TX (US)

(72) Inventors: Thomas A. Swanson, Houston, TX (US); Abdul Siraj, Sugar Land, TX (US); Jun Su An, Houston, TX (US); Paul Schuber, Sugar Land, TX (US); Jason Helander, Richmond, TX (US)

(73) Assignee: SOLUGEN, INC., Houston, TX (US)

( * ) Notice: Subject to any disclaimer, the term of this patent is extended or adjusted under 35 U.S.C. 154(b) by 30 days.

(21) Appl. No.: 17/924,871

(22) PCT Filed: Jun. 17, 2021

(86) PCT No.: PCT/US2021/037894
§ 371 (c)(1),
(2) Date: Nov. 11, 2022

(87) PCT Pub. No.: WO2021/257873
PCT Pub. Date: Dec. 23, 2021

(65) Prior Publication Data
US 2023/0183549 A1 Jun. 15, 2023

Related U.S. Application Data

(60) Provisional application No. 63/040,355, filed on Jun. 17, 2020.

(51) Int. Cl.
*E21B 43/16* (2006.01)
*C09K 8/524* (2006.01)
(Continued)

(52) U.S. Cl.
CPC .............. *C09K 8/524* (2013.01); *C09K 8/584* (2013.01); *E21B 37/06* (2013.01); *E21B 43/16* (2013.01)

(58) Field of Classification Search
CPC ................................ C09K 8/524; E21B 43/16
(Continued)

(56) References Cited

U.S. PATENT DOCUMENTS

| | | | |
|---|---|---|---|
| 2003/0119678 A1* | 6/2003 | Crews | C09K 8/685 507/100 |
| 2005/0056423 A1* | 3/2005 | Todd | E21B 37/06 166/305.1 |

(Continued)

FOREIGN PATENT DOCUMENTS

| | | |
|---|---|---|
| CN | 106867490 A | 6/2017 |
| WO | 2021/025957 A1 | 2/2021 |

OTHER PUBLICATIONS

PCT/US2021/037894 International Search Report and Written Opinion dated Nov. 4, 2021 (16 p.).

(Continued)

*Primary Examiner* — William D Hutton, Jr.
*Assistant Examiner* — Ashish K Varma
(74) *Attorney, Agent, or Firm* — CONLEY ROSE, P.C.

(57) ABSTRACT

A method of reducing injection pressure during a hydrocarbon resource recovery operation, the method comprising: introducing a treatment fluid comprising a biochelant and a solvent for a time period sufficient to reduce an injection pressure of the injection well by equal to or greater than about 25%. A method of asphaltene and paraffin dispersion, the method comprising introducing a treatment fluid into a well disposed within a subterranean formation, wherein the treatment fluid comprises a biochelant and solvent.

20 Claims, 5 Drawing Sheets

(51) Int. Cl.
*C09K 8/584* (2006.01)
*E21B 37/06* (2006.01)

(58) Field of Classification Search
USPC ...................................... 166/270.1
See application file for complete search history.

(56) References Cited

U.S. PATENT DOCUMENTS

2012/0055669 A1* 3/2012 Levin ................. E21B 33/1208
166/250.17
2014/0303047 A1* 10/2014 McDaniel ................ C09K 8/52
507/209
2016/0160621 A1* 6/2016 Collins .................... C09K 8/58
166/275

OTHER PUBLICATIONS

Well Stimulation Treatment First Annual Report, California Department of Conservation, Division of Oil, Gas, and Geothermal Resources, Dec. 31, 2015 (117 p.).

* cited by examiner

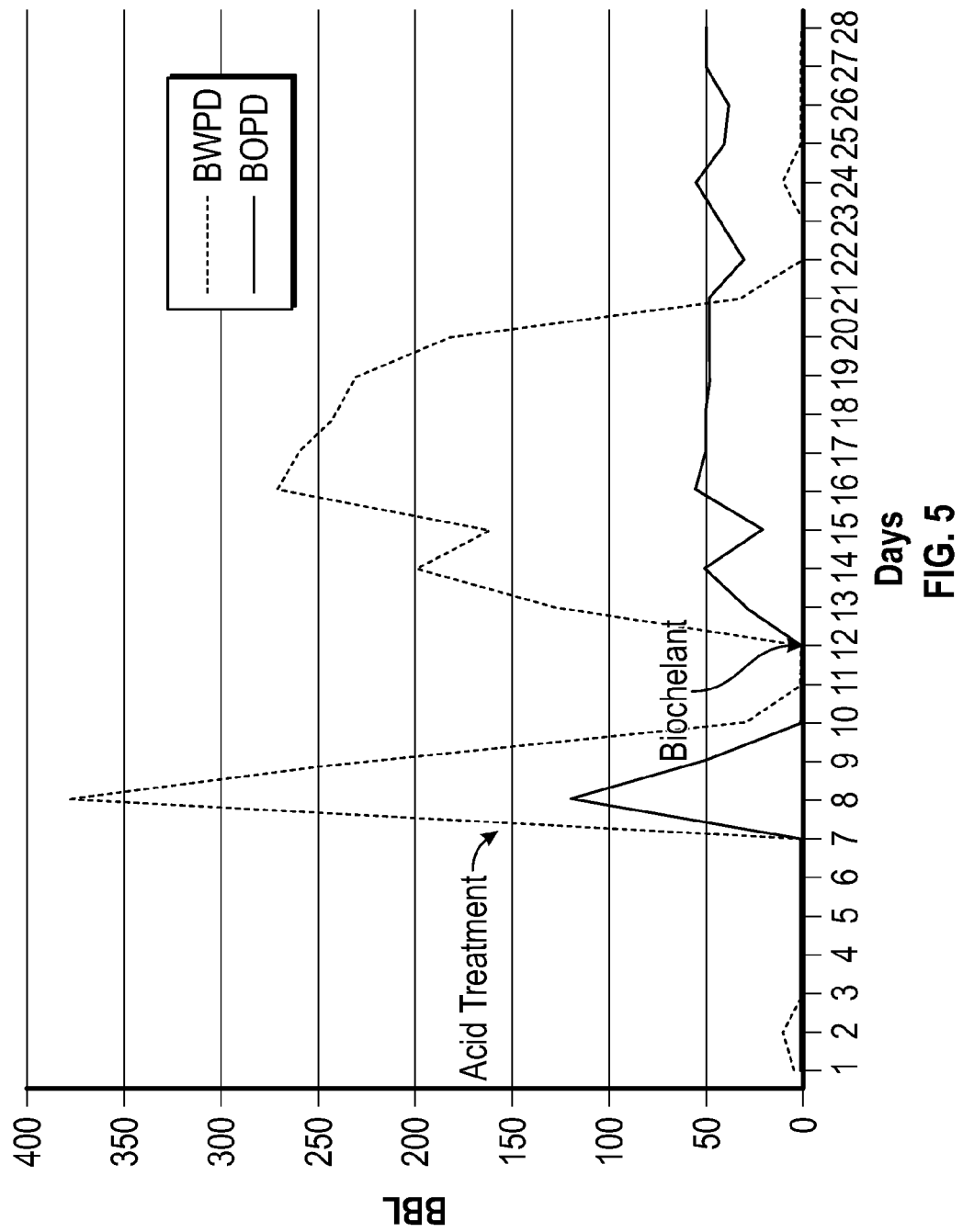

COMPOSITIONS AND METHODS FOR REDUCING INJECTION PRESSURE IN RESOURCE RECOVERY OPERATIONS

CROSS-REFERENCE TO RELATED APPLICATIONS

This application is a 35 U.S.C. § 371 national stage application of PCT/US2021/037894 filed Jun. 17, 2021, and entitled "Compositions and Methods for Reducing Injection Pressure in Resource Recovery Operations," which claims the benefit of U.S. provisional patent application Ser. No. 63/040,355 filed Jun. 17, 2020, and entitled "Compositions and Methods for Reducing Injection Pressure in Resource Recovery Operations" each of which is hereby incorporated herein by reference in its entirety for all purposes.

STATEMENT REGARDING FEDERALLY SPONSORED RESEARCH OR DEVELOPMENT

Not applicable.

FIELD

The present disclosure relates generally to compositions and methods for use in wellbore servicing operations. More particularly the present disclosure relates to compositions and methods for facilitating oil recovery by reducing injection pressures.

BACKGROUND

As oil and gas activities undergo higher levels of public scrutiny, regulators have responded with more stringent laws and guidelines. This is especially the case in the state of California, where recent regulations have resulted in key changes such as: (i) stronger testing requirements designed to identify potential leaks; (ii) increased data requirements to ensure proposed projects are fully evaluated; (iii) continuous well pressure monitoring; (iv) requirements to automatically cease injection when there is a risk to safety or the environment; (v) requirements to disclose chemical additives for injection wells close to water supply wells; and (vi) methods to calculate maximum allowable surface injection pressures.

SUMMARY

Disclosed herein is a method of reducing injection pressure during a hydrocarbon resource recovery operation, the method comprising: introducing a treatment fluid comprising a biochelant and a solvent for a time period sufficient to reduce an injection pressure of the injection well by equal to or greater than about 25%.

Also disclosed herein is a method of asphaltene and paraffin dispersion, the method comprising introducing a treatment fluid into a well disposed within a subterranean formation, wherein the treatment fluid comprises a biochelant and solvent.

BRIEF DESCRIPTION OF THE DRAWINGS

For a detailed description of the aspects of the presently disclosed subject matter, reference will now be made to the accompanying drawings in which;

FIG. 5 is a graphical illustration of the barrels of water and barrels of oil produced from a production well as a function of time after treatment with a conventional fluid and after treatment with a treatment fluid of the present disclosure in accordance with Example 1.

DETAILED DESCRIPTION

Figure 1:
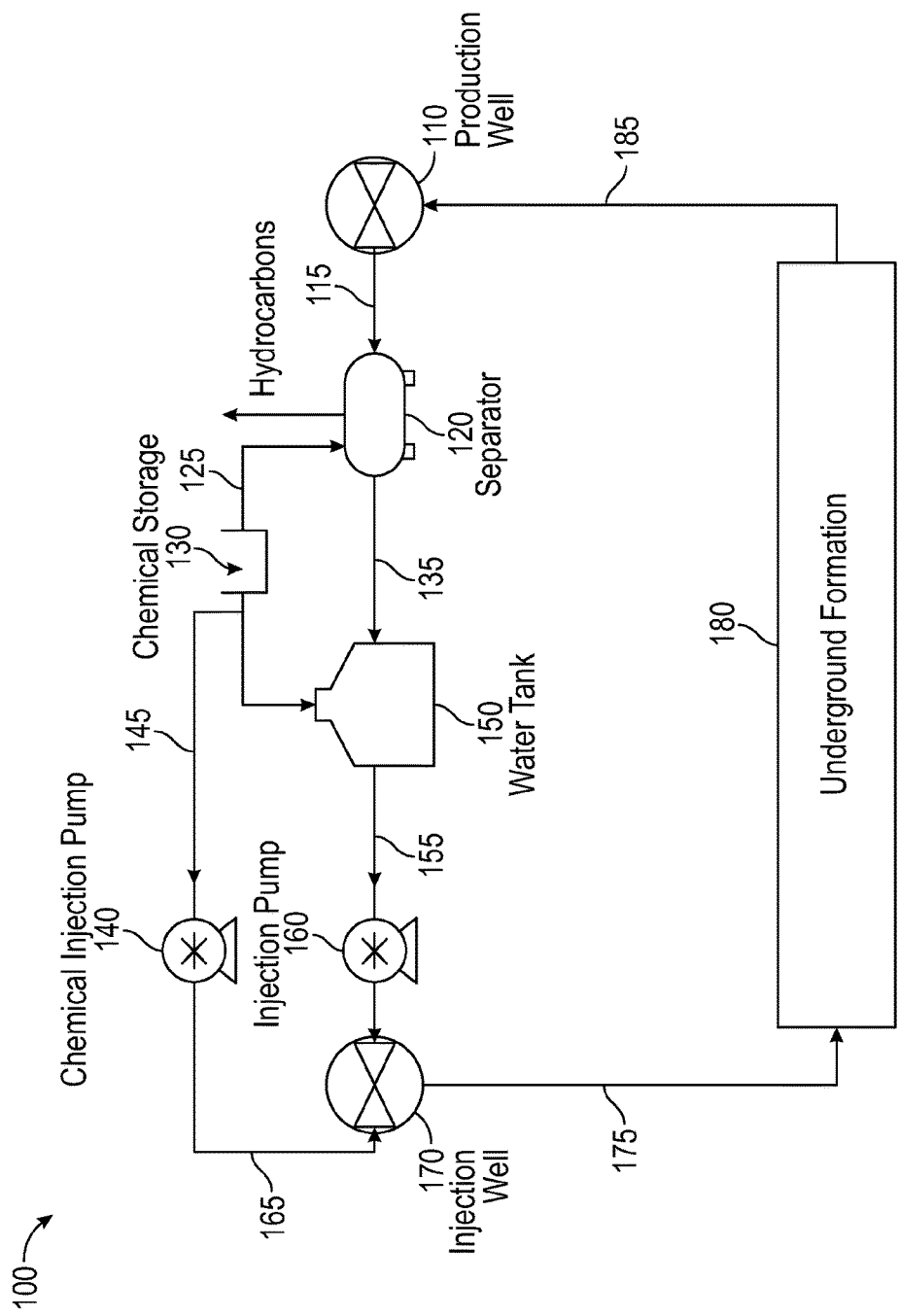
FIG. 1 is a schematic view of an embodiment of an injection and production system in accordance with the principles described herein.

Due to the aforementioned regulations, significant challenges have been posed to the oil and gas industry. In particular, the industry is strongly incentivized to identify solutions that can reduce injection pressures while also being environmentally friendly. This is especially the case in California, as approximately 10 oilfield barrels (bbl) of water are required to produce 1 bbl of oil from the formation. If water is not injected, then many operators cannot produce from the reservoir. As a result, injectivity is directly correlated with productivity.

Water flooding, steam injection, and other EOR (Enhanced Oil Recovery) methods are widely used in the oil and gas industry to improve hydrocarbon recovery. As most primary recovery rates are relatively low, any methods that increase total recovery yield a higher return on investment. In conventional oil and gas wells, primary depletion is usually around 20% to 30%, while unconventional wells yield even less recovery, often around 10%. In many states, there are numerous networks of producing and injecting wells that function as a single system. The injection wells are used to inject water into the reservoir to increase pressure within the reservoir and "sweep" oil in the reservoir into one or more of the production wells in the same network.

Accordingly, a need exists for novel compositions and methods to address unacceptable injection pressures that may develop during a hydrocarbon resource recovery operation.

Disclosed herein are compositions and methods for mitigating the injection pressure increase that is often observed in hydrocarbon resource recovery operations (HRRO). As noted above, the maximum allowable surface injection pressure may be regulated such that the pressure limit serves to limit the injection rate. Namely, the injection pressure increase is typically accompanied by a decrease in injection rate once the maximum allowable surface injection pressure is reached, thus compromising the overall hydrocarbon recovery operation. Factors that can reduce injection rate and increase injection pressure include: (a) scaling on tubulars, perforations or formation; (b) formation of iron sulfide on surface facility equipment, tubulars, perforations or wellbore formation; (c) corrosion that affects tubular integrity; and (d) paraffin/asphaltene fouling on tubulars, perforation and the formation.

The compositions disclosed herein provide some user and/or process desired functionality to a hydrocarbon recovery operation and are termed treatment fluids. In an aspect, the treatment fluids of the present disclosure comprise a biochelant and a solvent. These treatment fluids may be used in any HRRO such as such as drilling, completing, and stimulating operations. Methods of introducing these treatment fluids to a HRRO are described in more detail later herein.

In an aspect, the treatment fluid of the present disclosure includes a chelant and solvent. In an aspect, the treatment fluids comprises a chelant (also known as a chelating agent), alternatively the composition comprises a biochelant. Herein, a chelant, also termed a sequestrant or a chelating agent, refers to a molecule capable of bonding a metal. The chelating agent is a ligand that contains two or more electron-donating groups so that more than one bond is formed between each of the atoms on the ligand to the metal. This bond can also be dative or a coordinating covalent bond meaning the electrons from each electronegative atom provides both electrons to form the bond to the metal center. Additionally, a chelant suitable for use in the present disclosure comprises a material capable of effectively chelating to a metal cation in any oxidation state. For example, the chelant may bind to a metal in the monovalent, divalent or, trivalent oxidation state. The chelant may also bind the metal cation in higher oxidation states (e.g., up to 10).

In an aspect, the chelant is a biochelant. As used herein, the prefix "bio" indicates that the chemical is produced by a biological process such as using an enzyme catalyst.

In an aspect, the biochelant comprises aldonic acid, uronic acid, aldaric acid, or a combination thereof; and a counter cation. The counter cation may comprise an alkali metal (Group I), an alkali earth metal (Group II), a transition metal, or a combination thereof. In certain aspects, the counter cation is sodium, potassium, magnesium, calcium, strontium, cesium, copper, iron, palladium, manganese, or a combination thereof.

In an aspect, the biochelant comprises a glucose oxidation product, a gluconic acid oxidation product, a gluconate, or a combination thereof. The glucose oxidation product, gluconic acid oxidation product, gluconate, or the combination thereof may be buffered to a suitable pH. Buffering can be carried out using any suitable methodology such as by using a pH adjusting material in an amount of from about 1 weight percent (wt. %) to about 10 wt. %, alternatively from about 1 wt. % to about 3 wt. %, or alternatively from about 5 wt. % to about 9 wt. % based on the total weight of the biochelant. In an aspect, the biochelant comprises from about 1 wt. % to about 8 wt. % of a caustic solution in a 20 wt. % gluconate solution. Herein, all weight percentages are based on the total weight of specified compositions (e.g., treatment fluid) unless indicated otherwise.

Alternatively, the biochelant comprises a buffered glucose oxidation product, a buffered gluconic acid oxidation product, or a combination thereof. In such aspects, the buffered glucose oxidation product, the buffered gluconic acid oxidation product, or the combination thereof is buffered to a suitable pH (e.g., 6-7) using any suitable acid or base such as sodium hydroxide. In such aspects, the biochelant comprises a mixture of gluconic acid and glucaric acid, and further comprises a minor component species comprising n-keto-acids, $C_2$-$C_6$ diacids, or a combination thereof. In an aspect, the biochelant comprises BIOCHELATE™ metal chelation product commercially available from Solugen Inc. of Houston, Texas.

In an aspect, the treatment fluid of the present disclosure further comprises a solvent. When used with aqueous solutions, the solvent can comprise water. In some aspects, the treatment fluid may be winterized with the use of an alcohol as a solvent such as methanol, ethanol, isopropanol, ethylene glycol, propylene glycol or a combination thereof.

In one or more aspects, solvents for use in a treatment fluid of the present disclosure is an organic solvent. For example, the solvent may comprise xylene, toluene, naptha, terpenes, natural gas condensates, or a combination thereof. In an aspect, the solvent is present in an amount sufficient to meet some user and/or process goal such as an appropriate rheology. In the alternative, the solvent comprises the remainder of the treatment fluid when all other components are accounted for.

In some aspects, the treatment fluid of the present disclosure comprises an oxidizer. Examples of oxidizers suitable for use in the present disclosure include, but are not limited to, hydrogen peroxide, peracetic acid, chlorine dioxide, perpropionic acid, sodium hypochlorite, or a combination thereof. In an aspect, the oxidizer comprises hydrogen peroxide. In an aspect, the treatment fluid of the present disclosure includes a scale inhibitor. Scale inhibitors suitable for use in treatment fluids of the present disclosure include, without limitation, phosphonates, polymeric phosphonates, carboxylic ions, sulphanates, poly(acrylic acid) (PAA), phosphinocarboxylic acid, or a combination thereof. In one or more aspects, the treatment fluid of the present disclosure comprises one or more acids. Acids suitable for use in the treatment fluid of the present disclosure include without limitation hydrochloric acid, acetic acid, citric acid, formic acid, hydrofluoric acid, derivatives thereof, and combinations thereof. In one or more aspects, the treatment fluid of the present disclosure comprises one or more surfactants. A surfactant suitable for use in the treatment fluid of the present disclosure may be selected from the group consisting of zwitterionic surfactants, cationic surfactants, anionic surfactants, non-ionic surfactants, alkyl amine oxides, alkyl betaines, alkyl amidopropyl betaine, alkyl sulfobetaines, alkyl sultaines, dihydroxyl alkyl glycinate, alkyl ampho acetate, phospholipids, alkyl aminopropionic acids, alkyl imino monopropionic acids, alkyl imino dipropionic acids, laurylamidopropyl betaine, decyl betaine, dodecyl betaine, lecithin, phosphatidyl choline, stearyltrimethylammonium chloride, cetyltrimethylammonium tosylate, cetyltrimethylammonium chloride, cetyltrimethylammonium bromide, myristyltrimethylammonium chloride, myristyltrimethylammonium bromide, dodecyltrimethylammonium chloride, dodecyltrimethylammonium bromide, decyltrimethylammonium chloride, decyltrimethylammonium bromide, octyltrimethylammonium chloride, erucyl bis-(hydroxy ethyl)methylammonium chloride, erucyltrimethylammonium chloride, sodium oleate, sodium stearate, sodium dodecylbenzenesulfonate, sodium myristate, sodium laurate, sodium decanoate, sodium caprylate, sodium cetyl sulfate, sodium myristyl sulfate, sodium lauryl sulfate, sodium decyl sulfate, sodium octyl sulfate, linear alcohol ethoxylates, polyoxyethylene alkylphenol ethoxylates, polyoxyethylene alcohol ethoxylates, polyoxyethylene esters of fatty acids, polyoxyethylene mercaptans, polyoxyethylene alkylamines, polyol ester surfactants, and a combination thereof. In one or more aspects, the treatment fluid of the present disclosure comprises one or more mutual solvents or mutual solvent precursors. Mutual solvents suitable for use in the present disclosure include for example and without limitation glycol ethers such as ethylene glycol monobutylether (EGMBE) or propylene glycol monobutylether; methanol; isopropyl alcohol; alcohol ethers; aldehydes; ketones; aromatic solvents; derivatives thereof; and combinations thereof. A mutual solvent precursor suitable for use in the present disclosure may comprise an esterified mutual solvent. Nonlimiting examples of esterified mutual solvents are butyl glycol acetate, butyl diglycol acetate, butyl triglycol acetate, butyl glycol dimethoxyacetal, isooctanol acetate, isopropanol acetate, 1-methoxy-2-propanol acetate and the corresponding acetals, propionates and the like. In one or more aspects, the treatment fluid of the present disclosure comprises one or more corrosion inhibitors. In an aspect, the corrosion inhibitor comprises azole and pyrimidine byproducts, zinc salts, copper salts, nickel salts, arsenic salts, flavonoids, alkaloids, byproducts of plants; phosphates, phosphonates, or a combination thereof. One or more additives may be included in the treatment fluid of the present disclosure to meet some user and/or process goal(s) provided such additives are compatible with the other components of the treatment fluid, Examples of such additives include but are not limited to a salt, a fluid loss agent, a vitrified shale, a thixotropic agent, a dispersing agent, a surfactant, a day stabilizer, a silicate-control agent, a biocide, a biostatic agent, a storage stabilizer, a filtration control additive, acids, bases, mutual solvents, accelerants, defoamer oxidation inhibitors, thinners, scavengers, gas scavengers, or a combination thereof. Additives may be included singularly or in combinations in amounts effective to meet some user and/or application goal.

Herein, each disclosed component may be present in the treatment fluid in amounts ranging from about 1 wt. % to about 99 wt,%.

In an aspect, a treatment fluid of the present disclosure is used in a HRRO to provide a combination of iron chelation and scale inhibition. Iron chelation acts to inhibit scale. Scale inhibitors prevent scale accumulation in the formation and wellbore. In addition, scale inhibitors enhance formation permeability by eliminating scale in the formation and casing. In such aspects the treatment fluid comprises a biochelant, a solvent, and scale inhibitor, each of the type disclosed previously herein.

In an aspect, a treatment fluid of the present disclosure is used in a HRRO to provide paraffintasphaltene dispersion and iron chelation. Paraffin from waxy crude oil (paraffin fouling) and asphaltene deposits effectively reduce the diameter of tubing/pipes through which the production fluids flow (e.g., oil) resulting in increased pressure requirements to maintain the flow rate. Paraffins/asphaltenes may also increase the gel strength in crude oil requiring increased pressures to maintain the flow rate. In an aspect, a treatment fluid of the type disclosed herein is used to disperse the paraffinslasphaltenes found in HRRO. In such aspects, the treatment fluid comprises a biochelant and an organic solvent (e.g., xylene).

In some aspects, a treatment fluid of the present disclosure is introduced to an HRRO operation (e.g., fracturing) by blending with an acid. The subsequent acidic fluid may be introduced to the formation (e.g., pumped downhole) and used to facilitate the HRRO. Acids suitable for use in the treatment fluid include without limitation hydrochloric acid, acetic acid, citric acid, formic acid, hydrofluoric acid, derivatives thereof, and combinations thereof.

A method of the present disclosure may comprise introduction of a treatment fluid to a total injection and production system, A method of the present disclosure will now be described in connection FIG. 1. Referring now to FIG. 1, an embodiment of a total injection and production system 100 includes a production well 110 disposed upstream of a separator 120. The separator 120 is in fluid communication with the production well 110 via a flowline 115, and in fluid communication with a water tank 150 via a flowline 135. The water tank 150 is downstream of the production well 110 and the water tank 150. Thus, the production well 110 may also be in fluid communication with the water tank 150 via a flowlines 115, 135 and the separator 120. Downstream of the water tank 150 is an injection well 170. A chemical storage unit 130 is arranged to be in fluid communication with both the water tank 150 and the separator 120 via flowlines 145, 125, respectively, while also being in fluid communication with the injection well 170 via a flowline 165. Both the injection well 170 and production well 110 are in fluid communication with the underground formation 180 containing hydrocarbon reserves via flowlines 175, 185, respectively. Conveyance of the treatment fluid from the water tank 150 to the injection well 170 or from the chemical storage tank 130 to the injection well 170 may be facilitated by injection pumps 160, 140, respectively.

In an aspect, a method is provided to introduce a treatment fluid or treatment fluid into a total injection and production system (e.g., system 100) to reduce injection pressure, increase injection rate, and increase hydrocarbon production. The aforementioned treatment fluids may be introduced at the well site for example at the surface of the facility equipment or at the separation facility.

Referring again to FIG. 1, a treatment fluid of the type disclosed herein may be introduced directly to the injection well 170 from the chemical storage tank 130 via the flowline 165 with the assistance of an injection pump 140. In another aspect, not depicted, a treatment fluid of the type disclosed herein may be introduced to an annulus disposed in the formation. In this case the method allows for a direct injection into the underground formation, for example via the flowline 175 where the treatment fluid once introduced to the annulus.

In another aspect, a treatment fluid of the type disclosed herein may be introduced to the water tank 150 and conveyed to the injection well 170 via the flowline 155 with the assistance of an injection pump 160, In yet another aspect, a treatment fluid of the type disclosed herein may be introduced to a separator 120 and conveyed via the flowline 135 to the water tank 150 and subsequently to the injection well 170 via the flowline 155 with the assistance of an injection pump 160.

Once introduced to the injection well 170 or other location (e.g., an annulus), the treatment fluid functions to mitigate scale formation and fouling issues within the injection well 170 or other location, as well as other fluid passages, ports, perforations, and flow paths in fluid communication with the injection well 170 or other location. In such aspects, the treatment fluid functions to mitigate the issues associated with an increased injection pressure, for example by effectively chelating iron to prevent iron sulfide formation thereby providing protection downstream of the injection point. The removal of iron sulfide offers the potential to reduce injection pressure, increased injection rate, and increased production. Such benefits will be followed all the way from the injection point to the reservoir.

Figure 2:
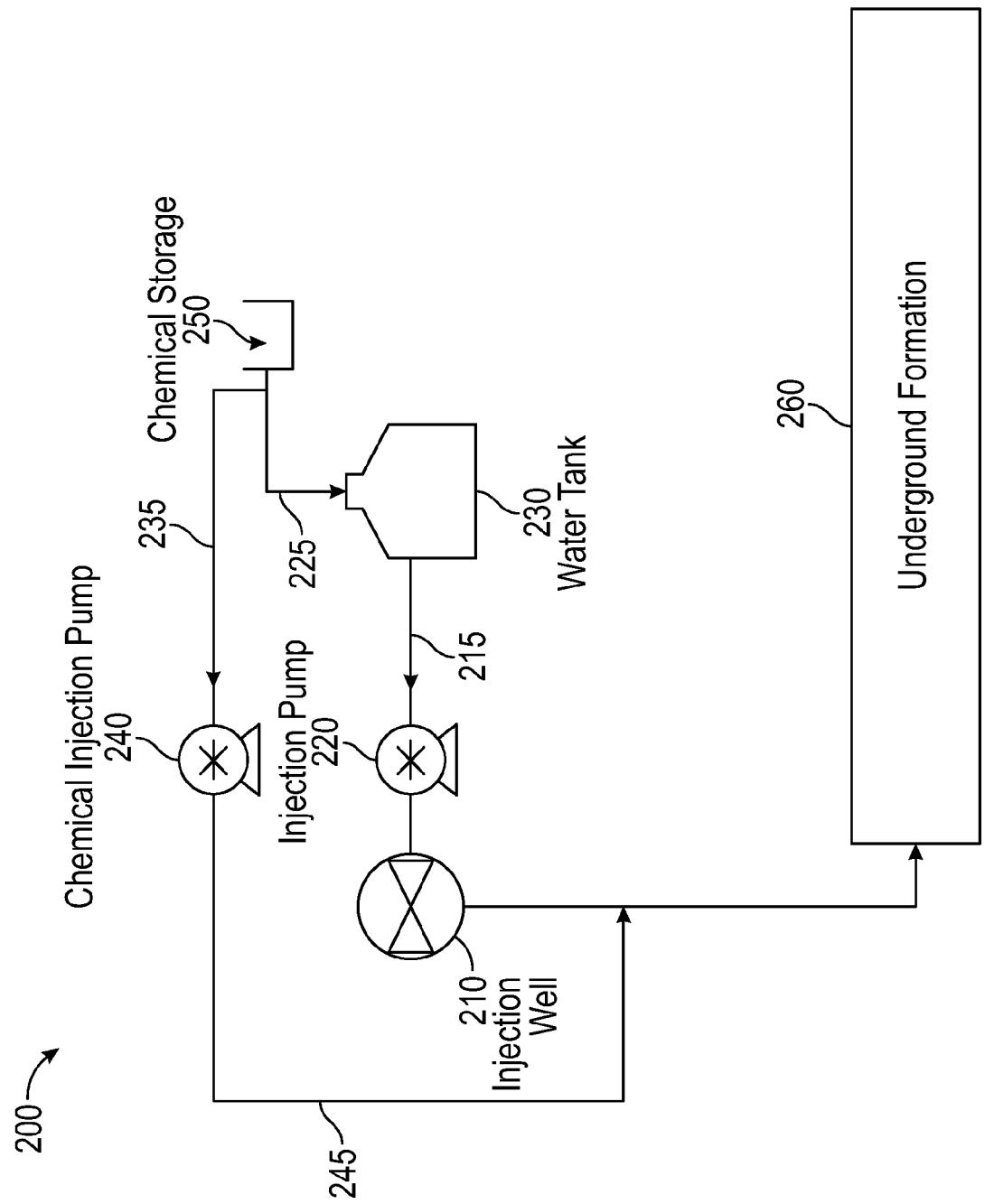
FIG. 2 is a schematic view of an embodiment of a saltwater disposal system in accordance with the principles described herein.

In an aspect, the treatment fluid of the present disclosure may be introduced to an injection well that is a component of a water disposal operation such as a saltwater disposal operation, A method of the present disclosure will now be described in connection FIG. 2. Referring now to FIG. 2, a treatment fluid of the present disclosure may be introduced from a chemical storage container or vessel 250 via a flowline 225 into a water tank 230, The water tank 230 is disposed upstream of an injection well 210. In an aspect, the treatment fluid may be conveyed to the injection well 210 via the flowline 215 with the assistance of an injection pump 220 and supplied downhole to the underground formation 260 via a flowline 255, In another aspect, the treatment fluid may be conveyed from the chemical storage vessel 250 to the annulus of the wellbore via the flowlines 235, 245 with the assistance of a chemical injection pump 240.

Figure 3:
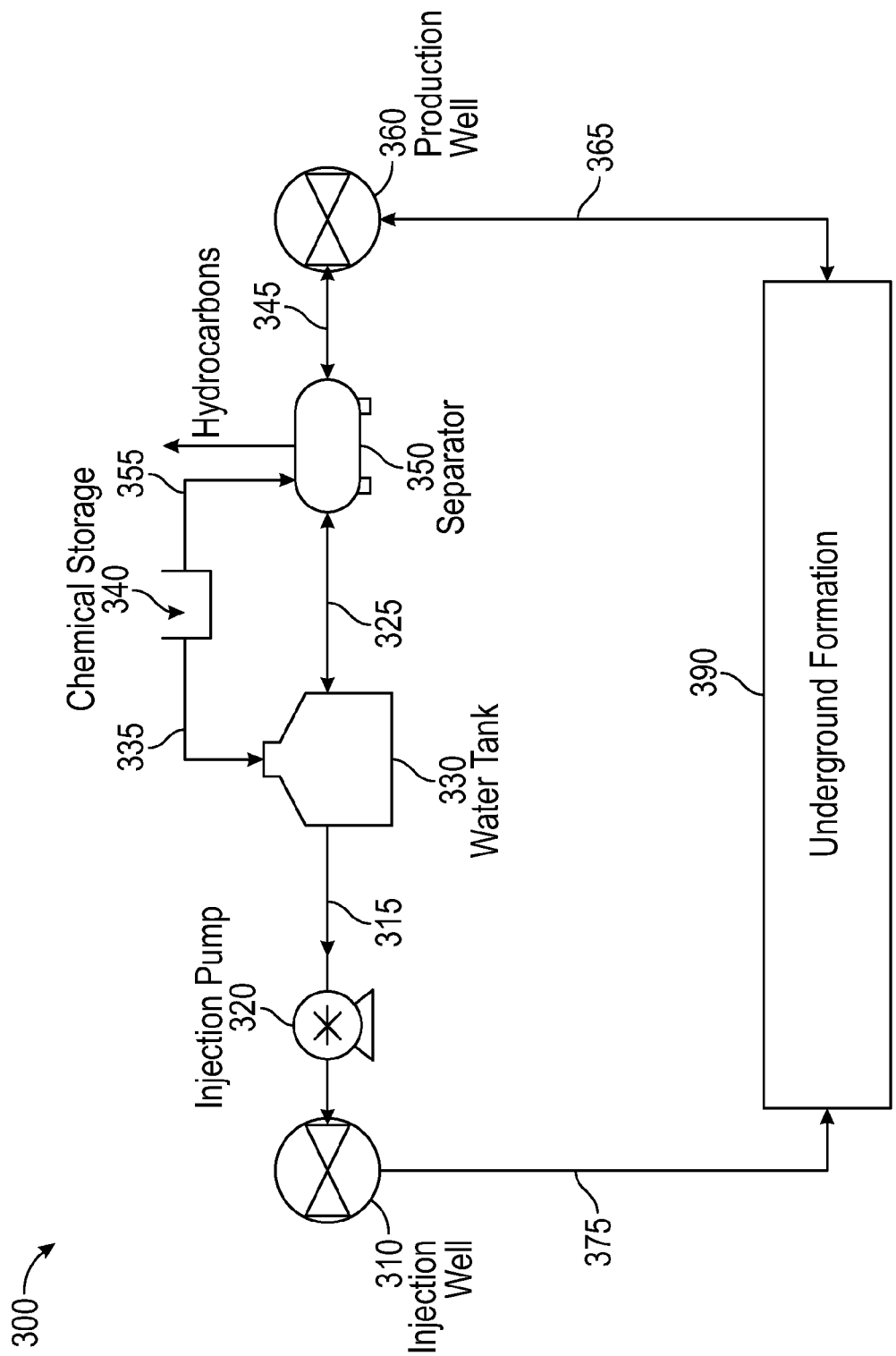
FIG. 3 is a schematic view of an embodiment of an injection and production system in accordance with the principles described herein.

In an aspect, a treatment fluid of the present disclosure may be introduced to a water tank that is component of an injection and production system, and subsequently supplied to a production well and/or subterranean formation comprising hydrocarbon reserves. A method of the present disclosure will now be described in connection FIG. 3. Referring now to FIG. 3, a treatment fluid of the present disclosure is contained in a chemical storage unit 340 and supplied from the chemical storage unit 340 to a water tank 330 via a flowline 335. The treatment fluid can also be supplied from the chemical storage unit 340 to a separator 350 via a flowline 355. Once the treatment fluid is introduced to the water tank 330, the mixture may be conveyed to the separator 350 via a flowline 325, and then supplied from the separator 350 to a production well 360 via a flowline 345. The treatment fluid supplied to the production well 360 can also be conveyed to the underground formation 390 via a flowline 365. Alternatively, the treatment fluid can be conveyed from the water tank 350 via a flowline 315 and the assistance of a pump 320 to injection well 310, which then feeds the treatment fluid to the underground formation 390 via a flowline 375. Thus, the treatment fluid can be supplied from the chemical storage unit 340 to the production well 360 and the corresponding flowline 365, and/or supplied from the chemical storage until 340 to the injection well 310 and the corresponding flowline 355.

Figure 4:
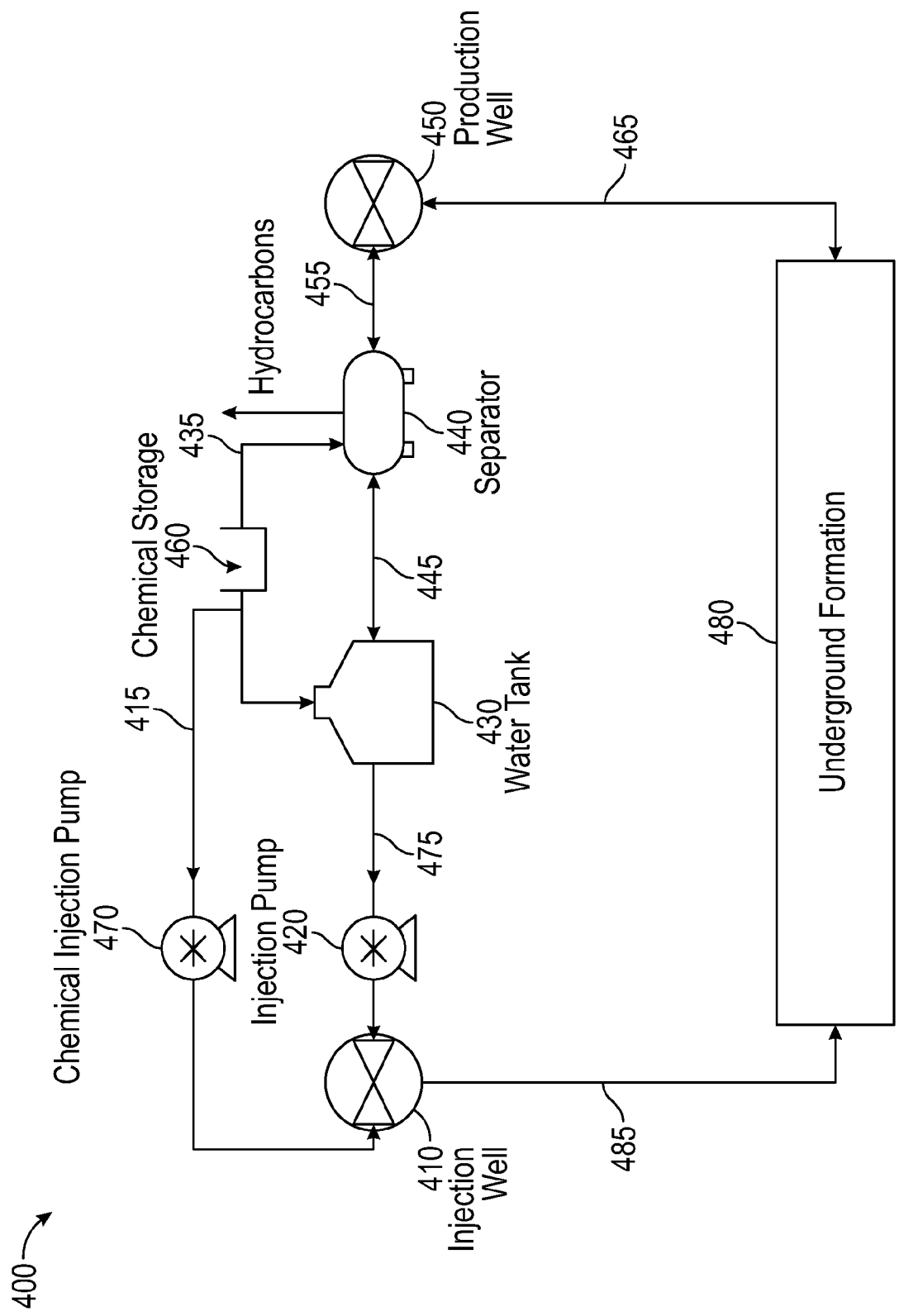
FIG. 4 is a schematic view of an embodiment of an injection and production system in accordance with the principles described herein.

In an aspect, a treatment fluid of the present disclosure may be introduced indirectly to the annulus in an injection and production system. A method of the present disclosure will now be described in connection FIG. 4. Referring now to FIG. 4, a treatment fluid of the present disclosure is contained in a chemical storage unit 460. From chemical storage unit 460, the treatment fluid may be introduced to an injection well 410, a water tank 430, or a separator 440 via a flowline 415, 425, 435, respectively. Once the treatment fluid is introduced to the water tank 430, the mixture may be conveyed to the separator 440 via a flowline 445, The treatment fluid introduced to the separator 440 may be conveyed via line 455 to the production well 450 before entering the underground formation 480 via a flowline 465. Treatment fluid may also exit the water tank 430 via a flowline 475 and be conveyed by an injection pump 420 to the injection well 410 where it enters the underground formation 480 via a flowline 485, The treatment fluid may also leave the chemical storage tank 460 and be conveyed by a pump 470 to the injection well 410 via the flowline 415 before being placed in underground formation 480 via line 485.

In an aspect, the compositions and method of the present disclosure may result in a HRRO being carried out an injection pressure that is reduced by from about 10% to about 75%, alternatively from about 10% to about 50% or alternatively from about 10% to 25% with a concomitant increase in injection rate and production rate of from about 10% to about 75%, alternatively from about 10% to about 50% or alternatively from about 10% to 25% when compared to a HRR© carried out in the absence of treatment fluids of the type disclosed herein.

The treatment fluids of the present disclosure may advantageously provide a combination of iron chelation and scale control. In some aspects, the treatment fluid is introduced to a wellbore formation to provide a combination of paraffiniasphaltene dispersion. In other aspects, the treatment fluid includes other materials or additives such as an acid or a surfactant and introduced to a formation to reduce injection pressure. The treatment fluids of the present disclosure provide an environmentally friendly, pH-stable alternative to the conventional methods and compositions used for treating issues associated with a need for increased injection pressure in an injection well that is a component of a wellbore servicing operation.

EXAMPLES

The presently disclosed subject matter having been generally described, the following examples are given as particular aspects of the subject matter and to demonstrate the practice and advantages thereof. It is understood that the examples are given by way of illustration and are not intended to limit the specification or the claims in any manner.

Example 1

An injection-production well was chosen for a field trial of a treatment fluid of the type disclosed herein. Specifically, the treatment fluid comprised a blend of gluconic acid and sodium gluconate. During the experiment, the BWPD (Barrels of water per day) and (BOPD) Barrels of oil per day were tracked. Higher water injection led to higher oil production. On day 6, a conventional treatment composition including a 2,000 gallon blend of hydrochloric acid (HCl), hydrofluoric acid (HF), and ethylenediaminetetraacetic acid (EDTA) was used. As shown in FIG. 5, the use of the conventional composition and associated method to address the increase pressure was effective, but had a steep decline in injection and production. On day 12, 55 gallons of a treatment fluid of the type disclosed herein was used. As shown in FIG. 5, the steep decline of injection or production was not seen when using a treatment fluid of the type disclosed herein.

Example 2

A second investigation of a treatment fluid of the type disclosed herein was carried out. Specifically, a Salt-Water Disposal (SWD) system that experienced scale deposition had a high Dp (differential pressure) on the injector. The end customer was operating a SWD facility handling over 25,000 barrels of water per day which regularly accepted frack water flowback waste streams with produced water.

Standard practice for addressing the high Dp for this HRRO was to utilize an oxidizer to prevent the natural fouling of the water and improve the precipitation of multivalents which could cause scale on the injectors. The effect of the oxidizer increased the formation of iron hydroxides which resulted in tubular scaling as noted in higher Op. Previously an iron control agent, tetrakis hydroxymethyl phosphonium sulfate (THPS) was introduced to the well and generated sulfate residuals which produced difficult to remove barium and strontium scales. Tetrakis hydroxymethyl phosphonium chloride (THPC) was also tested but proved uneconomical.

A treatment fluid of the present disclosure was injected at the SWD well upstream of the API pit prior to surge tanks and injection. The treatment fluid contained a biochelant which was a mixture of gluconic acid and sodium gluconate and hydrogen peroxide as an oxidizer.

The effect of the treatment fluid in reducing the injection pressure was monitored via Dp on the injector wells. The data is presented in Table 1. PAA is peracetic acid.

TABLE 1

| Hours | Product | Concentration [ppm] | Injection Pressure [psi] |
|---|---|---|---|
| 24 | Pre-trial, PAA/THPS | 150/50 | 1300 |
| 48 | Biochelant/Oxidizer Combo | 75 | 1290 |
| 72 | Biochelant/Oxidizer Combo | 100 | 1260 |
| 96 | Biochelant/Oxidizer Combo | 150 | 1240 |

As seen in Table 1, the treatment fluids of the present disclosure was able to reduce Dp on the injector by 60 psi in 7 days. Furthermore, the treatment fluid yielded less dosage than the incumbent PAATTHPS by 50 ppm.

Example 3

The effect of treating a network of salt-water disposal wells with a treatment fluid of the present disclosure was investigated. Specifically, the HRRO was an operation involving disposal of produced water in a network of salt-water disposal wells. A blend of acids and phosphonates were being utilized to control scale on the surface and injection tubulars due to the high concentration of multivalent ions. Surface tankage prior to injection was also maintained in atmospheric state which posed additional challenges due to the high probability of iron scale. High concentrations of barium and strontium was also present.

A treatment fluid of the present disclosure was introduced to the network of salt-water disposal weds and was found to be effective in reduced injection pressure and increasing water injection, while reducing the active dosage of chemical. The results are presented in Table 2.

TABLE 2

| Additive for Water Treatment | Dosage (ppm Active) | Injection Pressure (psi) | Daily Max Ave. BWID |
|---|---|---|---|
| Phosphonate & Synthetic Acid | 225 | 1713 | 925 |
| TREATMENT FLUID | 158 | 1639 | 1,168 |

Example 4

Treatment fluids of the type disclosed herein having an acid component were prepared and the formulation details for an HCl and HCl/HF composition are presented in Tables 3 and 4, respectively.

TABLE 3

| Component | % vol |
|---|---|
| 15% HCl | 98.40 |
| BioChelant | 0.50% |
| Surfactant | 0.60% |
| Corrosion Inhibitor | 0.50% |

TABLE 4

| Component | % vol |
|---|---|
| 7.5%/1.5% HCl/HF Acid | 97.9% |
| Mutual Solvent | 1.0% |
| BioChelant | 0.50% |
| Corrosion Inhibitor | 0.50% |

ADDITIONAL DISCLOSURE

The following are non-limiting, specific embodiments in accordance and with the present disclosure:

Part I

A first aspect which is a method comprising injecting a treatment fluid into an oil and gas facility to treat injection for production or disposal use.

A second aspect which is the method of the first aspect wherein the oil and gas facility is an injection well in an injection/production well network.

A third aspect which is the method of the first aspect wherein the oil and gas facility is a saltwater disposal well.

A fourth aspect which is the method of the first aspect wherein the oil and gas facility is a production well.

A fifth aspect which is the method of the first aspect wherein the oil and gas facility is a water treatment facility.

A sixth aspect which is the method of the first aspect wherein the oil and gas facility is a network of surface production equipment.

A seventh aspect which is the treatment fluid of the first aspect wherein the treatment fluid comprises a biochelant.

An eighth aspect which is the treatment fluid of the seventh aspect wherein the biochelant comprises a sodium glucarate liquid oxidation product comprising predominantly gluconate and glucarate anions with minor component species of n-keto-acids and $C_2$-$C_5$ diacids.

An ninth aspect which is the treatment fluid of the first aspect wherein the treatment fluid further comprises an acid, a mutual solvent, a mutual solvent precursor, a surfactant, a scale inhibitor, a corrosion inhibitor, or a combination or derivative thereof.

A tenth aspect which is the treatment fluid of the ninth aspect wherein the acid comprises hydrochloric acid, acetic acid, citric acid, formic acid, hydrofluoric acid, or a combination thereof or derivative thereof.

Part II

A first aspect which is a method of reducing injection pressure during a hydrocarbon resource recovery operation, the method comprising: introducing a treatment fluid comprising a biochelant and a solvent for a time period sufficient to reduce an injection pressure of the injection well by equal to or greater than about 25%.

A second aspect which is the method of the first aspect wherein the biochelant comprises uronic acid, aldaric acid, a salt thereof, a derivative thereof, or a combination thereof.

A third aspect which is the method of any the first through second aspects wherein the biochelant comprises sodium gluconate, a glucarate, an oxidation product of sodium glucarate, gluconate, a derivative thereof, or a combination thereof.

A fourth aspect which is the method of any of the first through third aspects wherein the biochelant comprises a buffered glucose oxidation product, a buffered gluconic acid oxidation product, or a combination thereof.

A fifth aspect which is the method of the fourth aspect wherein the buffered glucose oxidation product, the buffered gluconic acid oxidation product, or the combination thereof further comprises n-keto-acids, $C_2$-$C_6$ diacids, or a combination thereof, A sixth aspect, which is the method of any of the first through fifth aspects wherein the biochelant is present in an amount of from about 1 wt. % to about 99 wt. % based on the total weight of the treatment fluid.

A seventh aspect which is the method of any of the first through sixth aspects wherein the solvent comprises xylene, toluene, naptha, terpene, natural gas condensates, or a combination thereof.

An eighth aspect which is the method of any of the first through seventh aspects wherein the solvent comprises water.

A ninth aspect which is the method of any of the first through eighth aspects wherein the solvent methanol, ethanol, isopropanol, ethylene glycol, propylene glycol, or a combination thereof.

A tenth aspect which the method of any of the first through ninth aspects wherein the treatment fluid further comprises: a surfactant, an acid, a scale inhibitor, a corrosion inhibitor, a mutual solvent, a mutual solvent precursor, a derivative thereof, or a combination thereof.

An eleventh aspect which is the method of the tenth aspect wherein the acid comprises hydrochloric acid, acetic acid, citric acid, formic acid, hydrofluoric acid, a derivative thereof, or a combination thereof.

A twelfth aspect which is the method of the tenth aspect wherein the surfactant comprises zwitterionic surfactants, cationic surfactants, anionic surfactants, non-ionic surfactants, alkyl amine oxides, alkyl betaines, alkyl amidopropyl betaine, alkyl sulfobetaines, alkyl sultaines, dihydroxyl alkyl glycinate, alkyl ampho acetate, phospholipids, alkyl aminopropionic acids, alkyl imino monopropionic acids, alkyl imino dipropionic acids, laurylamidopropyl betaine, decyl betaine, dodecyl betaine, lecithin, phosphatidyl choline, stearyltrimethylammonium chloride, cetyltrimethylammonium tosylate, cetyltrimethylammonium chloride, cetyltrimethylammonium bromide, myristyltrimethylammonium chloride, myristyltrimethylammonium bromide, dodecyltrimethylammonium chloride, dodecyltrimethylammonium bromide, decyltrimethylammonium chloride, decyltrimethylammonium bromide, octyltrimethylammonium chloride, erucyl bis-(hydroxy ethypmethylammonium chloride, erucyltrimethylammonium chloride, sodium oleate, sodium stearate, sodium dodecylbenzenesulfonate, sodium myristate, sodium laurate, sodium decanoate, sodium caprylate, sodium cetyl sulfate, sodium myristyl sulfate, sodium lauryl sulfate, sodium decyl sulfate, sodium octyl sulfate, linear alcohol ethoxylates, polyoxyethylene alkylphenol ethoxylates, polyoxyethylene alcohol ethoxylates, polyoxyethylene esters of fatty acids, polyoxyethylene mercaptans, polyoxyethylene alkylamines, polyol ester surfactants, or a combination thereof.

A thirteenth aspect which is the method of the tenth aspect wherein the mutual solvent or mutual solvent precursor comprises ethylene glycol monobutylether (EGMBE), propylene glycol monobutylether; methanol; isopropyl alcohol; alcohol ethers; aldehydes; ketones; aromatic solvents; butyl glycol acetate, butyl diglycol acetate, butyl triglycol acetate, butyl glycol dimethoxyacetal, isooctanol acetate, isopropanol acetate, 1-methoxy-2-propanol acetate and the corresponding acetals, propionates and the like, a derivative thereof, or a combination thereof.

A fourteenth aspect which is the method of any of the first through thirteenth aspects wherein the hydrocarbon recovery resource operation comprises an injection well and a production well.

A fifteenth aspect which is the method of any of the first through fourteenth aspects, wherein the hydrocarbon recovery resource operation comprises water disposal.

A sixteenth aspect which is the method of any of the first through fifteenth aspects, wherein the injection pressure that is reduced by from about 10% to about 75% when compared to an otherwise similar hydrocarbon resource recovery operation in the absence of a treatment fluid.

A seventeenth aspect which is a method of asphaltene and paraffin dispersion, the method comprising introducing a treatment fluid into a well disposed within a subterranean formation, wherein the treatment fluid comprises a biochelant and solvent.

An eighteenth aspect which is the method of the seventeenth aspect, wherein the biochelant comprises sodium gluconate, a glucarate, an oxidation product of sodium glucarate, gluconate, a derivative thereof, or a combination thereof.

A nineteenth aspect which is the method of any of the seventeenth through eighteenth aspects wherein the solvent comprises xylene, toluene, naptha, terpene, natural gas condensates, or a combination thereof.

A twentieth aspect which is the method of any of the seventeenth through nineteenth aspects, wherein the biochelant is present in an amount of from about 1 wt. % to about 99 wt. % based on the total weight of the treatment fluid.

The subject matter having been shown and described, modifications thereof can be made by one skilled in the art without departing from the spirit and teachings of the subject matter. The aspects described herein are exemplary only and are not intended to be limiting. Many variations and modifications of the subject matter disclosed herein are possible and are within the scope of the disclosed subject matter. Mere numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 013, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is any limited by the claims which follow, that scope including all equivalents of the subject matter of the claims, Each and every claim is incorporated into the specification as an aspect of the present disclosure. Thus, the claims are a further description and are an addition to the aspects of the present invention. The discussion of a reference herein is not an admission that it is prior art to the presently disclosed subject matter, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of reducing injection pressure associated with a hydrocarbon resource recovery operation, the method comprising:
   introducing a treatment fluid comprising a biochelant and a solvent; and
   contacting the treatment fluid with a surface of hydrocarbon resource recovery operation that comprises asphaltenes, paraffins, or both for a time period sufficient to reduce an injection pressure of the injection well by equal to or greater than about 25%.

2. The method of claim 1, wherein the biochelant comprises uronic acid, aldaric acid, a salt thereof, a derivative thereof, or a combination thereof.

3. The method of claim 1, wherein the biochelant comprises sodium gluconate, a glucarate, an oxidation product of sodium glucarate, gluconate, a derivative thereof, or a combination thereof.

4. The method of claim 1, wherein the biochelant comprises a buffered glucose oxidation product, a buffered gluconic acid oxidation product, or a combination thereof.

5. The method of claim 4, wherein the buffered glucose oxidation product, the buffered gluconic acid oxidation product, or the combination thereof further comprises n-keto-acids, $C_2$-$C_6$ diacids, or a combination thereof.

6. The method of claim 1, wherein the biochelant is present in an amount of from about 1 wt. % to about 99 wt. % based on the total weight of the treatment fluid.

7. The method of claim 1, wherein the solvent comprises xylene, toluene, naptha, terpene, natural gas condensates, or a combination thereof.

8. The method of claim 1, wherein the solvent comprises water.

9. The method of claim 1, wherein the solvent methanol, ethanol, isopropanol, ethylene glycol, propylene glycol, or a combination thereof.

10. The method of claim 1, wherein the treatment fluid further comprises: a surfactant, an acid, a scale inhibitor, a corrosion inhibitor, a mutual solvent, a mutual solvent precursor, a derivative thereof, or a combination thereof.

11. The method of claim 10, wherein the acid comprises hydrochloric acid, acetic acid, citric acid, formic acid, hydrofluoric acid, a derivative thereof, or a combination thereof.

12. The method of claim 10, wherein the surfactant comprises zwitterionic surfactants, cationic surfactants, anionic surfactants, non-ionic surfactants, alkyl amine oxides, alkyl betaines, alkyl amidopropyl betaine, alkyl sulfobetaines, alkyl sultaines, dihydroxyl alkyl glycinate, alkyl ampho acetate, phospholipids, alkyl aminopropionic acids, alkyl imino monopropionic acids, alkyl imino dipropionic acids, laurylamidopropyl betaine, decyl betaine, dodecyl betaine, lecithin, phosphatidyl choline, stearyltrimethylammonium chloride, cetyltrimethylammonium tosylate, cetyltrimethylammonium chloride, cetyltrimethylammonium bromide, myristyltrimethylammonium chloride, myristyltrimethylammonium bromide, dodecyltrimethylammonium chloride, dodecyltrimethylammonium bromide, decyltrimethylammonium chloride, decyltrimethylammonium bromide, octyltrimethylammonium chloride, erucyl bis-(hydroxy ethyl)methylammonium chloride, erucyltrimethylammonium chloride, sodium oleate, sodium stearate, sodium dodecylbenzenesulfonate, sodium myristate, sodium laurate, sodium decanoate, sodium caprylate, sodium cetyl sulfate, sodium myristyl sulfate, sodium lauryl sulfate, sodium decyl sulfate, sodium octyl sulfate, linear alcohol ethoxylates, polyoxyethylene alkylphenol ethoxylates, polyoxyethylene alcohol ethoxylates, polyoxyethylene esters of fatty acids, polyoxyethylene mercaptans, polyoxyethylene alkylamines, polyol ester surfactants, or a combination thereof.

13. The method of claim 10, wherein the mutual solvent or mutual solvent precursor comprises ethylene glycol monobutylether (EGMBE), propylene glycol monobutylether; methanol; isopropyl alcohol; alcohol ethers; aldehydes; ketones; aromatic solvents; butyl glycol acetate, butyl diglycol acetate, butyl triglycol acetate, butyl glycol dimethoxyacetal, isooctanol acetate, isopropanol acetate, 1-methoxy-2-propanol acetate and the corresponding acetals, propionates and the like, a derivative thereof, or a combination thereof.

14. The method of claim 1, wherein the hydrocarbon recovery resource operation comprises an injection well and a production well.

15. The method of claim 1, wherein the hydrocarbon recovery resource operation comprises water disposal.

16. The method of claim 1, wherein the injection pressure that is reduced by from about 10% to about 75% when compared to an otherwise similar hydrocarbon resource recovery operation in the absence of a treatment fluid.

17. A method of asphaltene and paraffin dispersion, the method comprising:
   introducing a treatment fluid into a well disposed within a subterranean formation, wherein the treatment fluid comprises a biochelant and solvent; and
   contacting treatment fluid with a surface dis the well that comprises asphaltenes, paraffins, or both.

18. The method of claim 17, wherein the biochelant comprises sodium gluconate, a glucarate, an oxidation product of sodium glucarate, gluconate, a derivative thereof, or a combination thereof.

19. The method of claim 17, wherein the solvent comprises xylene, toluene, naptha, terpene, natural gas condensates, or a combination thereof.

20. The method of claim 17, wherein the biochelant is present in an amount of from about 1 wt. % to about 99 wt. % based on the total weight of the treatment fluid.

* * * * *